United States Patent
Hironaka

(10) Patent No.: US 12,381,018 B2
(45) Date of Patent: Aug. 5, 2025

(54) WIRE PROTECTOR WITH NOTCH FOR CUTTING TARGET WIRE

(71) Applicant: TOYOTA JIDOSHA KABUSHIKI KAISHA, Toyota (JP)

(72) Inventor: Riyoji Hironaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 18/223,202

(22) Filed: Jul. 18, 2023

(65) Prior Publication Data

US 2024/0029919 A1   Jan. 25, 2024

(30) Foreign Application Priority Data

Jul. 22, 2022   (JP) .................................. 2022-117234

(51) Int. Cl.
*H01B 7/18* (2006.01)
*B60L 50/60* (2019.01)
*B60R 16/02* (2006.01)

(52) U.S. Cl.
CPC ................ *H01B 7/18* (2013.01); *B60L 50/60* (2019.02); *B60R 16/0215* (2013.01)

(58) Field of Classification Search
CPC ... B60L 3/04; B60L 50/60; B60L 3/00; B60R 16/0215; B60R 16/02; H01B 7/18; H02G 3/0437; H02H 7/06
USPC ........................................................ 174/72 R
See application file for complete search history.

(56) References Cited

U.S. PATENT DOCUMENTS 10,985,542 B2   4/2021   Ide et al.
2002/0173185 A1   11/2002   Fukushima et al.

FOREIGN PATENT DOCUMENTS

| JP | H06-062718 U | 9/1994 |
| JP | H09-093751 A | 4/1997 |
| JP | 2002-343169 A | 11/2002 |
| JP | 2011-238359 A | 11/2011 |
| JP | 2016-063709 A | 4/2016 |
| JP | 2017-041306 A | 2/2017 |

*Primary Examiner* — Timothy J Thompson
*Assistant Examiner* — Michael F McAllister
(74) *Attorney, Agent, or Firm* — Oliff PLC

(57) ABSTRACT

A wire protector of the present disclosure partially covers a plurality of wires including a cut target wire to be cut in order to interrupt a power source in an emergency and includes a notch that allows the cut target wire to be cut by a tool. The wire protector enables the power source to be quickly interrupted in the emergency while suppressing a cost increase.

10 Claims, 7 Drawing Sheets

WIRE PROTECTOR WITH NOTCH FOR CUTTING TARGET WIRE

CROSS-REFERENCE TO RELATED APPLICATION

The present disclosure claims priority to Japanese Patent Application No. 2022-117234 filed on Jul. 22, 2022, which is incorporated herein by reference in its entirety including specification, drawings and claims.

TECHNICAL FIELD

The present disclosure relates to a wire protector that partially covers a plurality of wires.

BACKGROUND

A conventionally known power supply circuit include a load section, a power supply section that supplies electric power to the load section, a relay, and a circuit interrupting device capable of interrupting the circuit by a lever operation (as described in, for example, Japanese Patent Application Laid Open No. 2002-343169). The circuit interrupting device of the power supply circuit includes a power switch and an engagement detection switch that are respectively turned on and off in response to the lever operation. The power switch is connected in series with the load section, the power supply section and the relay. The relay of the power supply circuit is closed when the engagement detection switch is turned on, and the relay of the power supply circuit is opened when the engagement detection switch is turned off. The lever operation includes a rotary operation to turn on and off the engagement detection switch and a slide operation to turn on and off the power switch. When the power supply circuit is to be interrupted, the lever is rotated to open the relay, and the lever is slid to turn off the power switch. Thus, the power switch is turned off and the power supply circuit is interrupted.

SUMMARY

However, the above conventional circuit interrupting device has a relatively complex structure, which increases a cost of the power supply circuit. In addition, it is not always easy to install the above circuit interrupting device in a position where it is easy to identify and to operate the lever in an emergency. Therefore, depending on a location of the circuit interrupting device, the power supply circuit may not be quickly interrupted in the emergency.

A main object of the present disclosure is to quickly interrupt a power source in the emergency while suppressing a cost increase.

A wire protector of the present disclosure partially covers a plurality of wires including a cut target wire to be cut in order to interrupt a power source in an emergency and includes a notch that allows the cut target wire to be cut by a tool.

The wire protector of the present disclosure may be easily disposed in a position that is easy to identify in the emergency. The wire protector has a relatively simple structure and is manufactured at low cost. The wire protector of the present disclosure replaces an existing wire protector that covers the plurality of wires including the cut target wire, thereby suppressing an increase in the number of parts. The notch of the wire protector enables an easy and quick cutting of the cut target wire by the tool in the emergency. As a result, the wire protector of the present disclosure enables the power source to be quickly interrupted in the emergency while suppressing the cost increase.

DESCRIPTION OF EMBODIMENTS

The following describes some aspects of the present disclosure with reference to drawings.

Figure 1:
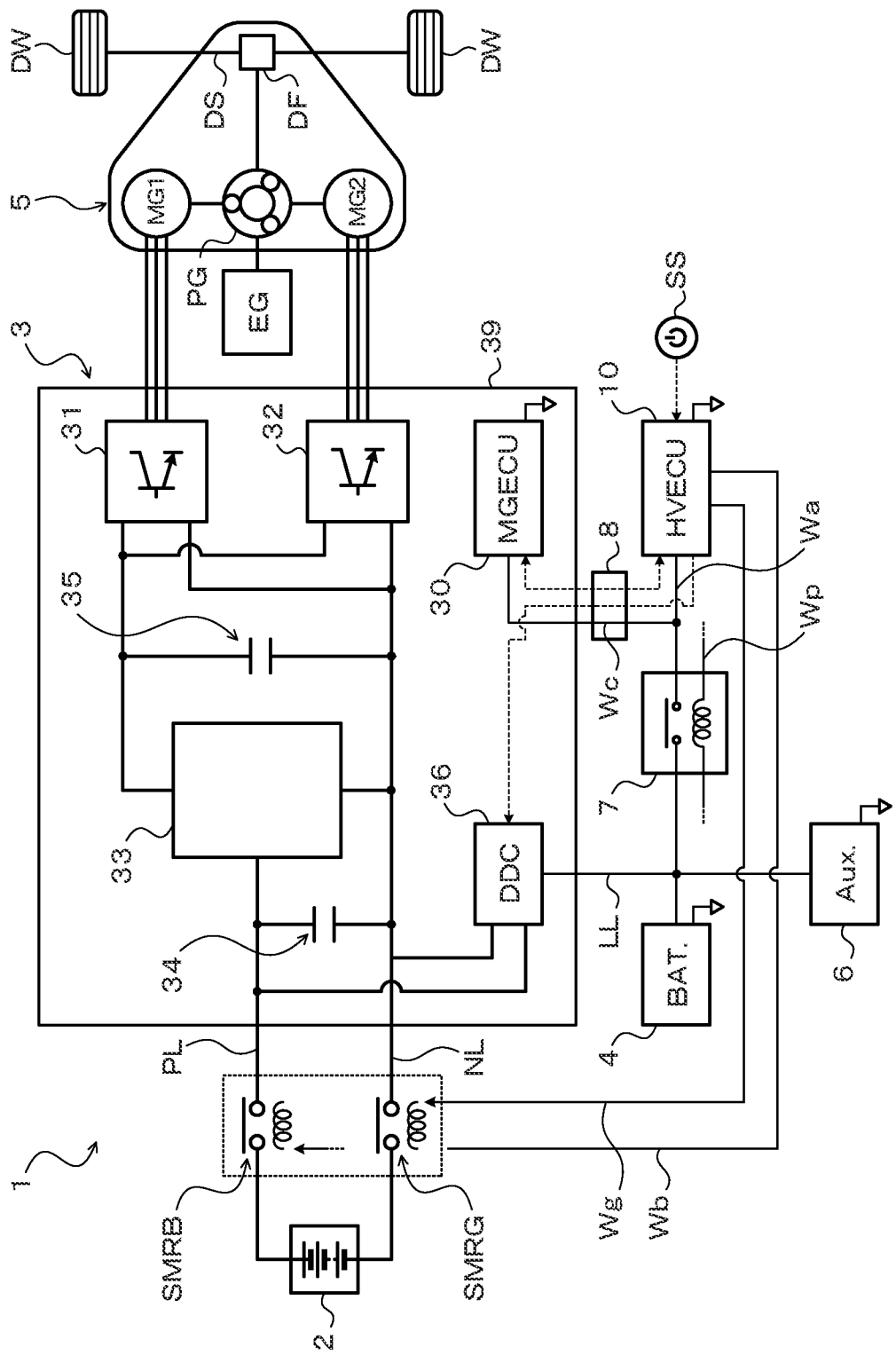
FIG. 1 is a schematic configuration diagram illustrating a vehicle including the wire protector of the present disclosure.

FIG. 1 is a schematic configuration diagram illustrating a hybrid electric vehicle (HEV) 1 as the vehicle including a wire protector 8 of the present disclosure. The hybrid electric vehicle 1 shown in FIG. 1 includes an engine EG, a single pinion planetary gear PG, and motor generators MG1 and MG2. Further, the hybrid electric vehicle 1 includes a high voltage battery (high voltage power source) 2 and a power control unit (hereinafter referred to as "PCU") that exchanges electric power with the high voltage battery 2 to drive the motor generators MG1 and MG2, a low voltage battery (low voltage power source) 4 that has a lower voltage than the high voltage battery 2, and a hybrid electronic control unit (hereinafter referred to as "HVECU") 10 that controls the entire vehicle.

The engine EG is a gasoline engine (internal combustion engine) that converts reciprocating motion of pistons resulting from combustion of a mixture of hydrocarbon fuel (gasoline) and air in a plurality of combustion chambers into rotational motion of a crankshaft (output shaft). The engine EG may be an LPG engine or a diesel engine. The engine EG is controlled by an engine electronic control unit (engine ECU), which is not shown in the drawings.

The planetary gear PG includes a sun gear, a ring gear, and a planet carrier that rotatably supports a plurality of pinion gears. The sun gear of the planetary gear PG is connected to the motor generator MG1 (rotor). The ring gear is connected to an output member and to the motor generator MG2 (rotor) via a reduction gear mechanism. The planet carrier is connected to the crankshaft of the engine EG. The output member connected to the ring gear is connected to left and right drive wheels via a gear train (not shown), a differential gear DF, and drive shafts DS. The planetary gear PG, the motor generators MG1 and MG2, the reduction gear mechanism, the gear train and the differential gear DF are accommodated in a transaxle case and configures a transaxle 5, which is connected to the engine EG, together with the transaxle case.

The motor generators MG1 and MG2 are both synchronous generator motors (three-phase AC motors). The motor generator MG1 is mainly driven by the engine EG under load operation to operate as a generator that generates electric power. The motor generator MG2 is mainly driven by at least one of electric power from the high voltage battery 2 and electric power from the motor generator MG1, and operates as an electric motor that generates driving torque. Further, the motor generator MG2 outputs regenerative braking torque when braking the hybrid electric vehicle 1. In addition, the motor generators MG1 and MG2 exchange electric power with the high voltage battery 2 via the PCU 3, and also exchange electric power with each other via the PCU 3.

The high voltage battery 2 has a rated output voltage of 200-400V, for example, and is mounted under a floor (below a floor panel) of the hybrid electric vehicle 1 near the rear seats, for example. The high voltage battery 2 includes a plurality of battery modules (battery stacks) that are connected in series and a battery case that accommodates the battery modules. Each of the battery modules of the high voltage battery 2 includes a plurality of battery cells (not shown) connected in series or parallel. Each of the battery cell is, for example, a lithium-ion secondary battery or a nickel-metal hydride secondary battery. The high voltage battery 2 is monitored and managed by a battery management electronic control unit (battery ECU), that is not shown in the drawings.

A positive pole side power line PL is connected to a positive terminal of the high voltage battery 2 via a positive pole side system main relay SMRB (hereinafter referred to as "positive pole side relay SMRB"). A negative pole side power line NL is connected to a negative terminal of the high voltage battery 2 via a negative pole side system main relay SMRG (hereinafter referred to as "negative pole side relay SMRB"). Both the positive pole side relay SMRB and the negative pole side relay SMRG are contact-type (mechanical) relays that include a coil, movable contacts, and fixed contacts (not shown) In this embodiment, both the positive side relay SMRB and the negative side relay SMRG are normally open relays that is closed when excitation current is supplied to the coil.

Figure 2:
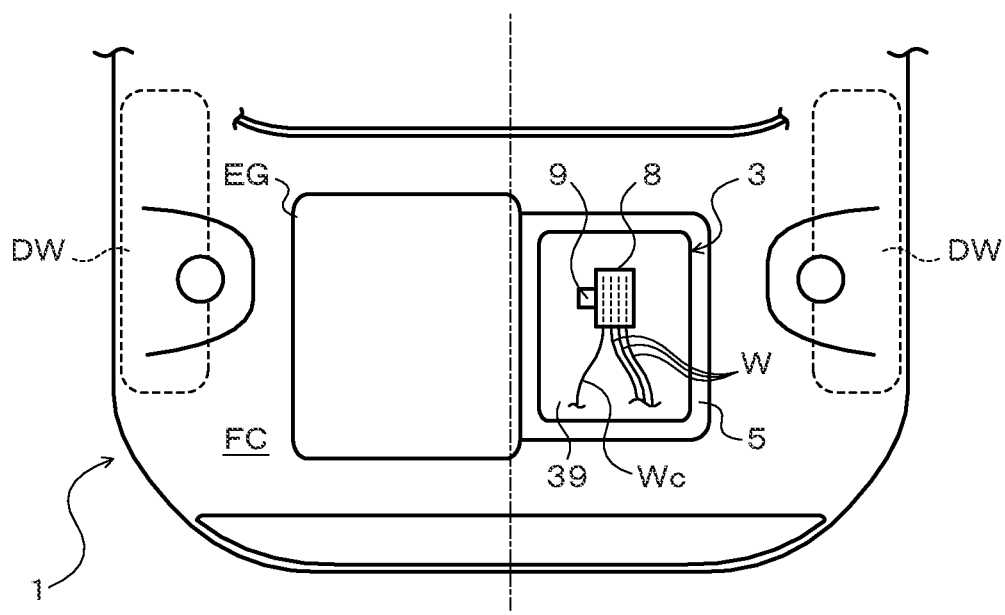
FIG. 2 is an enlarged view illustrating the vehicle including the wire protector of the present disclosure.

The PCU 3 includes a first inverter 31, a second inverter 32, a step-up/down converter (voltage converter) 33, a filter capacitor (first capacitor) 34, a smoothing capacitor (second capacitor) 35, a DC/DC converter (voltage converter) 36, a motor electronic control unit (hereinafter referred to as "MGECU") 30, and a case 39 that accommodates these elements. As shown in FIG. 2, the PCU 3 is mounted inside of a front compartment FC of the hybrid electric vehicle 1 such that the PCU 3 is located on a side of the engine EG and above the transaxle 5. When a hood (not shown) of the front compartment FC is opened, a top surface of the case 39 is exposed to the outside.

The first inverter 31 drives the motor generator MG1, and the second inverter 32 drives the motor generator MG2. The step-up/down converter 33 boosts electric power from the high voltage battery 2 and steps down voltage from the motor generators MG1 and MG2. The MGECU 30 includes CPU, ROM, RAM, input/output interface and the like, various drive circuits, and various logic ICs. The MGECU 30 controls the first and second inverters 31, 32 and the step-up/down converter 33.

As shown in FIG. 1, the DC/DC converter 36 is connected to the positive pole side power line PL between the positive pole side relay SMRB and the filter capacitor 34 and is connected to the negative pole side power line NL between the negative pole side relay SMRG and the filter capacitor 34. Further, the DC/DC converter 36 is connected to the low voltage battery 4 and a plurality of auxiliary devices 6 via a low voltage power line LL. The low voltage battery 4 is, for example, a lead-acid battery with a rated output voltage of about 12V. The DC/DC converter 36 steps down the electric power from the positive pole side power line PL (the high voltage battery 2 or the PCU 3) to a target voltage set by the HVECU 10. The stepped-down electric power is supplied to the low voltage power line LL (auxiliary devices 6 and low voltage battery 4). Further, the DC/DC converter 36 boosts the electric power from the low voltage battery 4 to the target voltage set by the HVECU 10. The boosted electric power is supplied to the positive pole side power line PL (the high voltage battery 2 and the PCU 3).

The electric power from the low voltage power line LL is supplied to control devices such as the HVECU 10, the engine ECU, the battery ECU, and the MGECU 30 via a power supply relay (IGCT relay) 7. The power supply relay 7 is a normally open mechanical relay that is controlled to be opened and closed by a power management electronic control unit (power management ECU, not shown). When the power management ECU closes the power supply relay 7, the control devices such as the HVECU 10 and the MGECU 30 are activated in response to a supply of electric power from the low voltage power line LL.

The HVECU 10 includes a microcomputer with CPU, ROM, RAM, input/output interface, and the like, various drive circuits, and various logic ICs. The HVECU 10 exchanges information (communication frames) with the engine ECU, the battery ECU, the MGECU 30 and the like via a shared communication line (CAN bus). Further, the HVECU 10 exchanges information (communication frames) with the engine ECU, the battery ECU, the MGECU 30 and the like via dedicated communication lines (local communication buses). A plurality of sensors and other devices are connected to the HVECU 10. The sensors include a start switch SS, an accelerator pedal position sensor, a shift position sensor, a vehicle speed sensor and the like. When the hybrid electric vehicle 1 is driven, HVECU 10 sets a required torque for driving based on an accelerator pedal position and a vehicle speed. In addition, the HVECU 10 sets a required power and a target rotational speed of the engine EG, torque command values for the motor generators MG1, MG2, and the like.

In this embodiment, the HVECU 10 controls the positive and negative pole side relays SMRB and SMRG to be opened and closed. That is, when the start switch SS is turned on by a driver and a system startup of the hybrid electric vehicle 1 is requested, the HVECU 10 supplies the excitation current to the coil of the positive pole side relay SMRB via a power supply wire (wire harness) Wb and also supplies the excitation current to the coil of the negative pole side relay SMRB via a power supply wire Wg. When each of the coils is excited and the positive and negative pole side relays SMRB and SMRG are normally closed (when the movable and fixed contacts to each other), the high voltage battery 2 and the PCU 3 are electrically connected to each other.

When the start switch SS is turned off by the driver and a system shutdown of the hybrid electric vehicle 1 is requested, the HVECU 10 interrupts the supply of excitation current to the positive and negative pole side relays SMRB and SMRG. As a result, each of the coils is de-energized and the positive and negative pole side relays SMRB and SMRG are opened (the movable and fixed contacts are separated), such that the high voltage battery and the PCU 3 are disconnected. When the power supply from the low voltage power line LL to at least one or more control devices such as the HVECU 10, the engine ECU, the battery ECU, and the MGECU 30 is interrupted due to some factor, the HVECU 10 interrupts the supply of excitation current to the positive and negative pole side relays SMRB and SMRG.

In an emergency such as a collision of the hybrid electric vehicle 1, the start switch SS may not be turned off by the driver or other persons (passengers), such that the power supply to the HVECU 10 and the like may be continued and the positive and negative pole side relays SMRB and SMRG may remain closed. In such a case, in order to ensure the safety of rescue operations and the like, the positive relay SMRB and the negative relay SMRG should be opened as soon as possible so as to quickly disconnect the high voltage battery 2 from an electric power system. For this reason, in the hybrid electric vehicle 1, a power supply wire Wc connecting the power supply relay 7 and the MGECU 30 is predetermined as a cut target wire to be cut in order to interrupt the high voltage battery 2 in the emergency. Further, in hybrid electric vehicle 1, in order to enable the power supply wire Wc to be easily and quickly cut in the emergency, the wire protector 8 is configured as described below.

Figure 3:
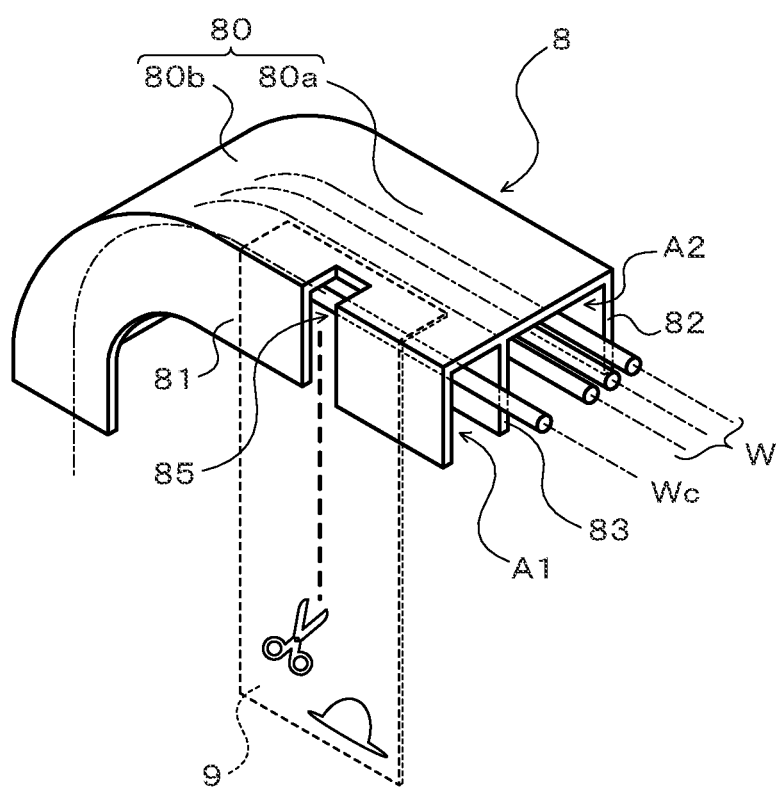
FIG. 3 is a diagrammatic perspective view illustrating the wire protector of the present disclosure.

FIG. 3 is a diagrammatic perspective view of the wire protector 8. The wire protector 8 shown in FIG. 8 partially covers and protects the above power supply wire Wc and a plurality of other wires (wire harnesses) W drawn from the case 39 of the PCU 3. Further, the wire protector 8 regulates paths of the power supply wire Wc and the plurality of wires W so as to extend along the surface of the case 39 without forming loops. Further, the wire protector 8 regulates paths of the power supply wire Wc and the plurality of wires W so as to extend along the surface of the case 39 without forming loops. The wire protector 8 is, for example, fitted into a receptacle (connector portion, not shown in the drawings) on the top surface of the case 39 of the PCU 3 and is held by the case 39 as shown in FIG. 2. The wire protector 8 may be secured to the case 39 via bolts and the like. The plurality of wires W other than the power supply wire Wc includes, for example, the shared communication line and the dedicated communication line that are connected to the MGECU 30.

The wire protector 8 is made of resin, for example. As shown in FIG. 3, the wire protector 8 includes a top plate portion 80, a first side wall 81, a second side wall 82, and a partition wall (partition) 83. The top plate portion 80 partially covers the power supply wire Wc and at least one other wire W from above. The top plate portion 80 includes a flat plate portion 80a with a flat surface and a curved portion 80b extended from the flat plate portion 80a so as to curve toward the case 39. The first side wall 81 is extended from one (left side in FIG. 3) side edge of the top plate portion 80 in a direction (downward in FIG. 3) intersecting (orthogonal to) the top plate portion 80. The second side wall 82 is extended from the other (right side in FIG. 3) side edge of the top plate portion 80 in the direction (downward in FIG. 3) intersecting (orthogonal to) the top plate portion 80. The first and second side walls 81, 82 respectively have a flat outer surface. In this embodiment, the curved portion 80b of the top plate portion 80 forms a connection portion to be fitted into the above described receptacle together with a part of the first side wall 81 and a part of the second side wall 82.

Figure 4:
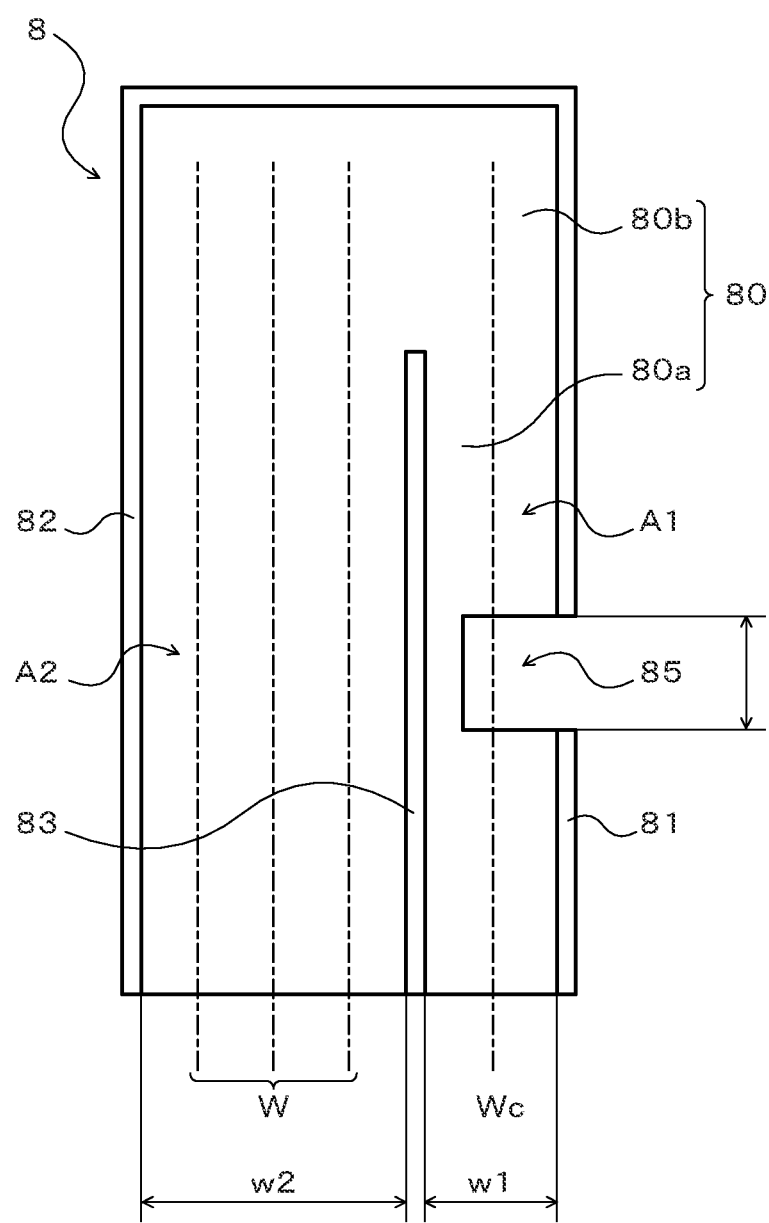
FIG. 4 is a bottom view illustrating the wire protector of the present disclosure.

The partition wall 83 is extended downwardly in FIG. 3 from an inner surface (bottom surface in FIG. 3) of the flat plate portion 80a of the top plate portion 80 so as to extend along (parallel to) the first and second side walls 81, 82. The partition wall 83, together with the flat plate portion 80a of the top plate portion 80 and the first side wall 81, defines a first area A1 through which the power supply wire We as the cut target wire is passed. Further, the partition wall 83, together with the flat plate portion 80a of the top plate portion 80 and the second side wall 82, defines a second area A2 through which the wires W other than the power supply wire Wc are passed. That is, the power supply wire Wc, together with the other wires W, is passed through a space defined by the curved portion 80b, the first and second side walls 81, 82 of the wire protector 8, and is drawn through the first area A1 onto the case 39 of the PCU 3. The plurality of wires W is passed through the space defined by the curved portion 80b, the first and second side walls 81, 82 and are drawn through the second area A2 onto the case 39 of the PCU 3. As shown in FIG. 4, a width w1 of the first area A1 is smaller than a width w2 of the second area A2 such that only the power supply wire Wc is passed through the first area A1 and the wires W other than the power supply wire Wc are not passed through the first area A1.

Further, a notch 85 is formed in the wire protector 8. The notch 85 allows the power supply wire Wc or the cut target wire to be cut by a cutting tool such as a nipper or a bolt clipper. In this embodiment, the notch 85 is an opening that spans the first side wall 81 and the flat plate portion 80a of the top plate portion 80, and opens at an end (bottom end in FIG. 2) of the first side wall 81. As shown in FIG. 3, a part of the power supply wire Wc passed through the first area A1 is exposed to the outside through the notch 85. A width d (see FIG. 4) of the notch 85 in a longitudinal direction of the first side wall 81 is determined such that the power supply wire Wc and the wires W are held by the wire protector 8 against vibrations generated by the hybrid electric vehicle 1 while allowing an insertion of the cutting tool (blade).

A sticker 9 with a mark and/or illustration printed thereon is affixed to the wire protector 8, as shown in FIG. 3. The mark and/or illustration on the sticker 9 instructs an operator to cut the power supply wire Wc in the emergency. In this embodiment, as shown in FIG. 3, the sticker 9 is affixed to the flat plate portion 80a and the flat first sidewall portion 81 around the notch 85 so as to cover the notch 85 and hang downwards from the first side wall 81. As a result, when the hood of the front compartment FC is opened, using the sticker 9 as a clue, the wire protector 8 and the power supply wire Wc as the cut target wire is quickly identified.

As described above, the wire protector 8 partially covers the plurality of wires W, and the power supply wire Wc as the cut target wire to be cut in order to interrupt the high voltage battery 2 in the emergency. Further, the wire protector 8 is easily disposed in the position such as the top surface of the case 39 of the PCU 3, which is easy to identify in the emergency. The wire protector 8 has a relatively simple structure and is manufactured at low cost. Furthermore, the wire protector 8 replaces an existing wire protector that covers the power supply wire Wc and the plurality of wires W, thereby suppressing an increase in the number of parts of the hybrid electric vehicle 1. The notch 85 of the wire protector 8 enables an easy and quick cutting of the power supply wire Wc to be cut by the cutting tool in the emergency. When the power supply wire Wc is cut, the power supply to the MGECU 30 is interrupted and accordingly the supply of excitation current to the positive and negative pole side relays SMRB, SMRG are interrupted by the HVECU 10. As a result, the wire protector 8 enables the high voltage battery 2 to be quickly interrupted in the emergency while suppressing the cost increase.

The wire protector 8 includes a top plate portion 80 that partially covers the power supply wire Wc and the plurality of wires W, the first side wall 81 extended from one side edge of the top plate portion 80, the second side wall 82 extended from the other side edge of the top plate portion 80, the partition wall 83 and the notch 85. The partition wall 83 includes the first area A1 through which the power supply wire Wc as the cut target wire is passed, and the second area A2 through which the plurality of wires W other than the power supply wire Wc are passed. The partition wall 83 defines the first area A1 together with the top plate portion 80 and the first side wall 81, and the partition wall 83 defines the second area A2 together with the top plate portion 80 and the second side wall 82. Further, the notch 85 is formed in the wire protector 8 so as to expose a part of the power supply wire Wc passed through the first area A1 to the outside. This enables the cutting tool to cut only the power supply wire Wc while visually checking the power supply wire We or the cut target wire. In the above embodiment, the notch 85 is the opening that spans the first side wall 81 and the flat plate portion 80a of the top plate portion 80. This allows the notch 85 to have an opening area large enough to cut the power supply wire Wc as the cut target wire with the tool, while ensuring the rigidity of the wire protector 8.

Figure 5:
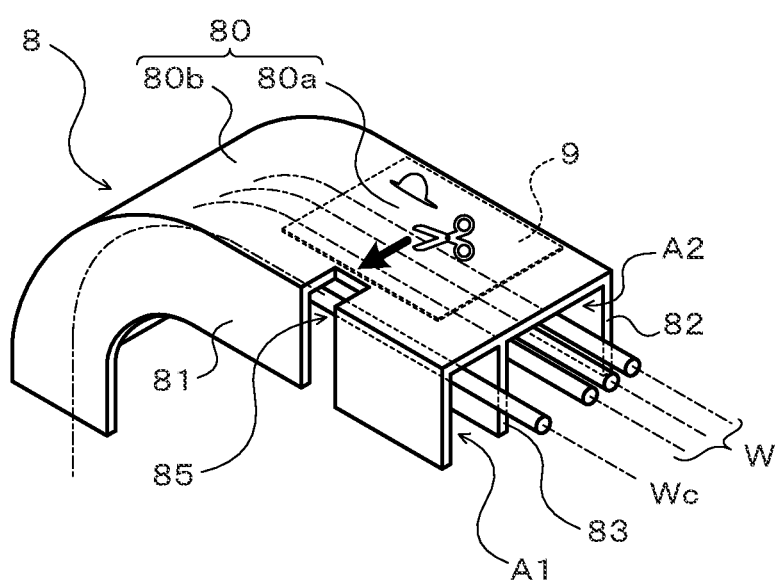
FIG. 5 is a diagrammatic perspective view illustrating the wire protector of the present disclosure.

Further, the sticker 9 is affixed to the wire protector 8 to instruct the cutting of the cut target wire in the emergency. This makes it easier to identify the wire protector 8 and the power supply wire Wc or the cut target wire in the emergency. In addition, the sticker 9 is affixed to the top plate portion 80 (flat plate portion 80a) and the flat surface of the first side wall 81. This enables the sticker 9 to be easily affixed to the wire protector 8 and satisfactorily suppresses a peeling of the sticker 9 from the wire protector 8. In the above embodiment, the sticker 9 is affixed to the flat plate portion 80a and the flat first sidewall portion 81 around the notch 85 so as to cover the notch 85, but is not limited this. That is, the sticker 9 may be affixed to any part of the wire protector 8. For example, as shown in FIG. 5, the sticker 9 may be affixed to the top plate portion 80 (flat plate portion 80a) around the notch 85 so as not to cover the notch 85.

When current flows in the power supply wire Wc or the cut target wire and the MGECU 30 is operated, the hybrid electric vehicle 1 including the wire protector 8 allows the positive and negative pole side relays SMRB, SMRG to be closed. That is, when no current is supplied to the MGECU 30 of the hybrid electric vehicle 1 from the power supply wire Wc, the HVECU 10 interrupts the supply of the excitation current to the positive and negative pole side relays SMRB, SMRG. As a result, the positive pole side relay SMRB and the negative pole side relay SMRG are opened by disconnecting the power supply wire Wc in the emergency, thereby interrupting the high voltage battery 2.

The cut target wire is not limited to the power supply wire Wc that connects the power supply relay 7 and the MGECU 30. That is, the cut target wire may be either a power supply wire Wa that connects the power supply relay 7 and the HVECU 10, a power supply wire Wb to supply the excitation current to the coil of the positive pole side relay SMRB, a power supply wire Wg to supply the excitation current to the coil of the negative pole side relay SMRG, or a power supply wire Wp to supply the excitation current to the coil of the power supply relay 7. A plurality of power supply wires may be selected from among those shown in the examples as the cut target wire.

In the above embodiment, the wire protector 8 is installed on the top surface of the case 39 of the PCU 3, that is exposed to the outside when the hood (not shown) of the front compartment FC is opened. This allows for quick access to the wire protector 8 and the power supply wire Wc or the cut target wire when the hood of the front compartment FC is opened.

Figure 6:
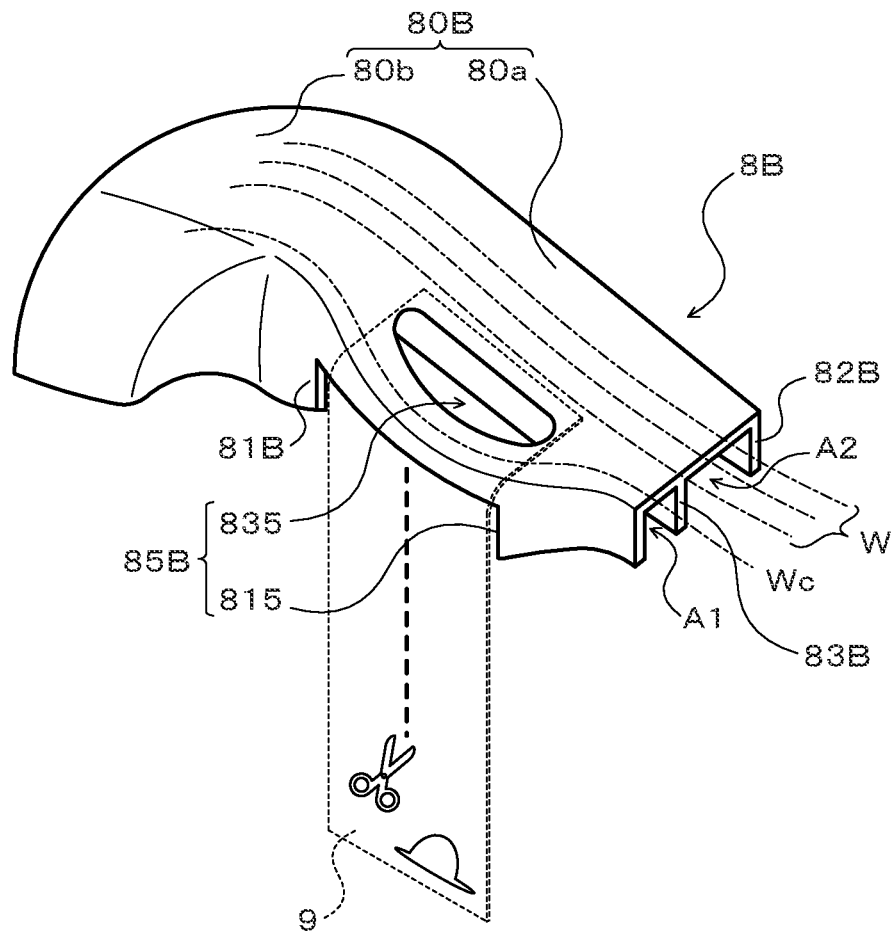
FIG. 6 is a diagrammatic perspective view illustrating another wire protector of the present disclosure.

FIG. 6 is a diagrammatic perspective view illustrating another wire protector 8 of the present disclosure. Among components of the wire protector 8B, the same components to those of the wire protector 8 described above are expressed by the same reference signs and their repeated description is omitted.

The wire protector 8B can be installed on the case 39 of the PCU 3 of the hybrid electric vehicle 1 instead of the above wire protector 8. The wire protector 8B is made of resin, for example. As shown in FIG. 6, the wire protector 8B includes a top plate portion BOB, a first side wall 81B, a second side wall 82B, and a partition wall (partition) 83B. The top plate portion 80B partially covers the power supply wire We and at least one other wire W from above. The top plate portion 80B includes a flat plate portion 80a with a flat surface and a curved portion 80b extended from the flat plate portion 80a so as to curve toward the case 39. The curved portion 80b of the top plate portion 80B forms a connection portion to be fitted into the receptacle of the case 39 together with a part of the first side wall 81 and a part of the second side wall 82.

The first side wall 81B extends from one side edge (left side in FIG. 7) of the top plate portion 80B The first side wall 81B extends from the side edge of one side (left side in FIG. 7) of the top plate portion 80B in a direction that intersects the top plate portion 80B (downward in FIG. 6). The second side wall 82B extends from the other side edge (right side in FIG. 7) of the top plate portion 80B in a direction that intersects the top plate portion 80B (downwardly in FIG. 6). Further, in the wire protector 8B, a part of an extended portion extended from the flat plate portion 80a of the first side wall 81B protrudes in a direction away from the second side wall 82B, as shown in FIGS. 6 and 7.

The partition wall 83B, together with the flat plate portion 80a of the top plate portion 80B and the first side wall 81B, defines the first area A1 through which the power supply wire Wc as the cut target wire is passed. Further, the partition wall 83B, together with the flat plate portion 80a of the top plate portion 80B and the second side wall 82B, defines the second area A2 through which the wires W other than the power supply wire Wc are passed. That is, the power supply wire Wc, together with the other wires W, is passed through the space defined by the curved portion 80b, the first and second side walls 81B, 82B of the wire protector 8B, and is drawn through the first area A1 onto the case 39 of the PCU 3. The plurality of wires W is passed through the space defined by the curved portion 80b, the first and second side walls 81B, 82B and are drawn through the second area A2 onto the case 39 of the PCU 3.

Figure 7:
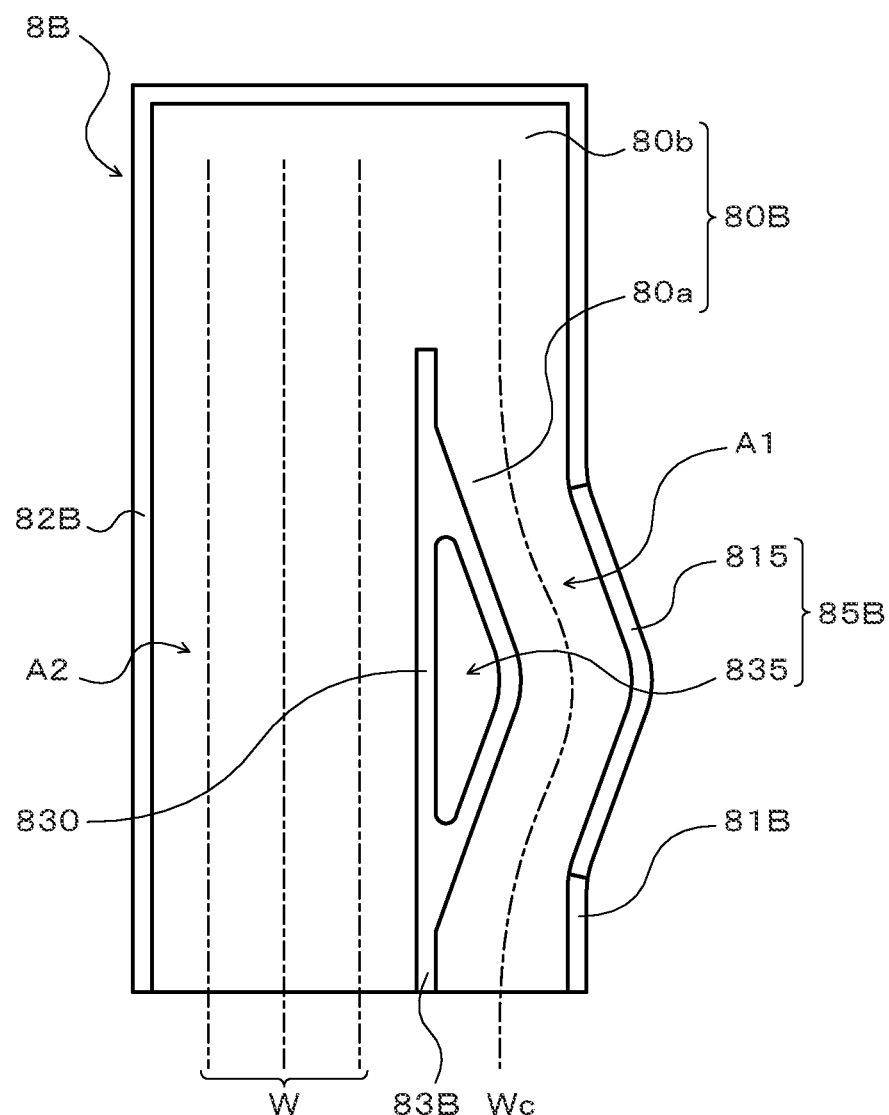
FIG. 7 is a bottom view illustrating another wire protector of the present disclosure.

Further, as shown in FIG. 7, the partition wall 83B includes a widened portion 830 that bulges toward the first area A1. In the example shown in FIGS. 6 and 7, the widened portion 830 bulges on the side of the first side wall 81B such that the side surface of the widened portion 830 on the side of the first area A1 extends along a portion of the first side wall 81B protruding in a direction away from the second side wall 82B. As shown in FIG. 7, the first area A1 forms a curved path that is once separated from the second area A2 and again approaches the second are A2. In this case, the second side wall 82B may be protruded in a direction away from the first side wall 81B instead of making the first side wall 81B protrude in the direction away from the second side wall 82B. The widened portion 830 of the partition wall 83B may bulge toward both the side of the first area A1 and the side of the second area A2.

Further, a hole portion (first notch) 835 is formed in the partition wall 83B such that the widened portion 830 is divided into a side of the first area A1 and a side of the second are A2. In the example shown in FIGS. 6 and 7, the hole portion 835 is a through hole penetrating the partition wall 83B (widened portion 830) in a direction that intersects the flat plate portion 80a of the top plate portion BOB. The hole portion 835 may be a non-through hole (depression) that does not penetrate the partition wall 83B (widened portion 83). In addition, a sidewall notch 815 (second notch) is formed in the wire protector 8B by cutting out the lower end portion in FIG. 3 (an end portion opposite to the side of the top plate portion 80B (flat plate portion 80a)) of the portion of the first side wall 81B protruding in the direction away from the second side wall 82B. As shown in FIG. 7, the sidewall notch 815 extends along the hole portion 835 of the partition wall 83B (widened portion 830). The sidewall notch 815 may be an opening (hole portion or slit) formed in the first side wall 81B so as to extend along the hole portion 835. These holes 835 and sidewall notches 815 configures a notch 85B of the wire protector 8B so at to allow the power supply wire Wc as the cut target wire to be cut by the cutting tool such as the nipper or the bolt clipper.

The sticker 9 is affixed to the wire protector 8B so as to instruct the operator to cut the power supply wire Wc or the cut target wire in the emergency. As shown in FIG. 6, the sticker 9 is affixed to the flat plate portion 80a and the flat first side wall portion 81B around the hole portion 835 so as to cover the hole portion 835 and hang downwards from the first side wall 81B. The sticker 9 may be affixed to the top plate portion 80B (flat plate portion 80a) around the hole portion 835 so as not to cover the hole portion 835.

As described above, the wire protector 8B partially covers the plurality of wires W, and the power supply wire Wc as the cut target wire to be cut in order to interrupt the high voltage battery 2 in the emergency. Further, the wire protector 8B is easily disposed in the position such as the top surface of the case 39 of the PCU 3, which is easy to identify in the emergency. The wire protector 8B has a relatively simple structure and is manufactured at low cost. Furthermore, the wire protector 8B replaces the existing wire protector that covers the power supply wire Wc and the plurality of wires W, thereby suppressing the increase in the number of parts of the hybrid electric vehicle 1.

The notch 85B of the wire protector 8B enables an easy and quick cutting of the power supply wire Wc to be cut by the cutting tool in the emergency. That is, the wire protector 8B allows the blade of the cutting tool to be inserted into the hole portion 835 and enables the power supply wire Wc and the portion of the wire protector 8B on the side of the first area A1 of the hole portion to be cut collectively, thereby disconnecting the high voltage battery 2 from the power system. Further, the sidewall notch 815 is formed in the wire protector 8B so as to extend along the lower end portion of the first side wall 81B. This reduces the rigidity of the wire protector 8B around the hole portion 835 and the sidewall notch 815 and makes it easier to collectively cut the power supply wire Wc and the portion of the wire protector 8B on the side of the first area A1 of the hole portion 835. As a result, the wire protector 8 enables the high voltage battery 2 to be quickly interrupted in the emergency while suppressing the cost increase.

The above wire protectors 8, 8B are not limited to those installed in the case 39 of the PCU 3, but may be installed anywhere in the front compartment FC of the hybrid electric vehicle 1. The wire protectors 8, 8B may be disposed in any compartment easily accessible in the emergency other than the front compartment FC, such as, for example, the rear compartment where a drive source of the vehicle is disposed.

The wire protectors 8, 8B do not necessarily have to regulate the path of the power supply wire Wc and/or the wires W, but may only cover the power supply wire Wc and/or the wires W. The Sticker 9 may be omitted from the wire protectors 8 and 8B. Further, the mark and/or illustration may be printed directly on the wire protectors 8, 8B so as to instruct the operator to cut the power supply wire Wc or the cut target wire in the emergency.

The vehicle to which the wire protectors 8 or 8B is applied is not limited to a two-motor type (series-parallel system) hybrid electric vehicle 1 with the planetary gear PG for power distribution. That is, the vehicle to which the wire protectors 8 or 8B is applied may be either a one-motor type hybrid vehicle, a series-type hybrid vehicle, a parallel-type hybrid vehicle, a plug-in hybrid electric vehicle (PHEV), or a battery electric vehicle (BEV). The vehicle to which the wire protectors 8 or 8B is applied may be a vehicle that includes only an engine (internal combustion engine) as a drive source, as long as the vehicle includes the power source.

As has been described above, the wire protector (8, 8B) of the present disclosure partially covers the plurality of wires (Wc, W) including a cut target wire (Wc) to be cut in order to interrupt the power source (2) in the emergency and includes the notch (85, 85B, 835, 815) that allows the cut target wire (Wc) to be cut by the tool.

The wire protector of the present disclosure may be easily disposed in a position that is easy to identify in the emergency. The wire protector has a relatively simple structure and is manufactured at low cost. The wire protector of the present disclosure replaces an existing wire protector that covers the plurality of wires including the cut target wire, thereby suppressing an increase in the number of parts. The notch of the wire protector enables an easy and quick cutting of the cut target wire by the tool in the emergency. As a result, the wire protector of the present disclosure enables the power source to be quickly interrupted in the emergency while suppressing the cost increase.

The wire protector (8) may further include: the partition (83) that divides the first area (A1) through which the cut target wire (Wc) is passed and the second area (A2) through which the wire (W) other than the cut target wire (Wc) is passed. The notch (85) may expose the part of the cut target wire (Wc) that is passed through the first area (A1) to the outside.

This enables the tool to cut only the cut target wire while visually checking the cut target wire.

The wire protector (8) may include: the top plate portion (80) partially covering the plurality of wires (Wc, W); the first side wall (81) extended from one side edge of the top plate portion (80); and the second side wall (82) extended from the other side edge of the top plate portion 80). The partition (83) may define the first area (A1) together with the top plate portion (80) and the first side wall (81), and the partition (83) may define the second area (A2) together with the top plate portion (80) and the second side wall (82). The notch (85) may be the opening that spans the first side wall (81) and the top plate portion (80).

This allows the notch to have the opening area large enough to cut the cut target wire with the tool, while ensuring the rigidity of the wire protector.

The wire protector (8B) may include the partition (83B) that divides the first area (A1) through which the cut target wire (Wc) is passed and the second area (A2) through which the wire (W) other than the cut target wire (Wc) is passed. The partition (83B) may include the widened portion (830) that bulges toward at least one of the side of the first area (A1) and the side of the second area (A2). The notch (85B) may include the hole portion (835) formed in the partition (83B) so as to divide the widened portion (830) into the side of the first area (A1) and the side of the second area (A2).

The wire protector allows at least part of the tool to be inserted into the hole portion to collectively cut the portion of the wire protector on the side of the first area of the hole portion and the cut target wire, thereby cutting off the power supply.

The wire protector (8B) may include: the top plate portion (80B) partially covering the plurality of wires (Wc, W); the first side wall (81B) extended from one side edge of the top plate portion (80B); and the second side wall (82B) extended from the other side edge of the top plate portion (80B). The partition (80B) may define the first area (A1) together with the top plate portion (80B) and the first side wall (81B), and define the second area (A2) together with the top plate portion (80B) and the second side wall (82B). The part of the first side wall (81B) may protrude in the direction away from the second side wall (82B). The widened portion (830) of the partition (83B) may bulge toward at least the side of the first side wall (81B). The notch (85B) may include the hole portion (835) and the sidewall notch (815) formed in the first side wall (81B) so as to extend along the hole portion (835).

This reduces the rigidity of the wire protector around the hole portion and the sidewall notch and makes it easier to collectively cut the cut target wire and the portion of the wire protector on the side of the first area of the hole portion.

The sticker (9) may be affixed to the wire protector (8, 8B) so as to instruct the cutting of the cut target wire (Wc) in the emergency.

This makes it easier to identify the wire protector and the cut target wire in the emergency.

The wire protector (8, 8B) may include the flat surface (80, 80B, 81, 81B) formed around the notch (85, 85B, 835, 815) and to which the sticker (9) is affixed.

This enables the sticker to be easily affixed to the wire protector and satisfactorily suppresses the peeling of the sticker from the wire protector.

The wire protector (8, 8B) may be applied to the vehicle (1) including a relay (SMRB, SMRG) connected to the power source (2). The relay (SMRB, SMRG) is allowed to be closed when current flows in the cut target wire (Wc).

This allows the relay to be opened by cutting the cut target wire in the emergency and the power source to be interrupted.

The relay (SMRB, SMRG) may be opened when the start switch (SS) of the vehicle (1) is turned off. In the emergency, the start switch (SS) may not be turned off by the occupant of the vehicle (1) and the relay (SMRB, SMRG) is left open.

The vehicle (1) may include the electric motor (MG2) that outputs driving power to a wheel (DW), and a power control device (3) that is connected to the power source (2) and drives the electric motor (MG2). The wire protector (8, 8B) may be installed on the top surface of the power control device (3) to regulate paths of the plurality of wires (Wc, W).

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The technique of the present disclosure is applicable to, for example, the manufacturing industry of the wire protector.

The invention claimed is:

1. A wire protector that partially covers a plurality of wires including a cut target wire to be cut in order to interrupt a power source in an emergency, the wire protector comprising:
   a notch that allows the cut target wire to be cut by a tool.

2. The wire protector according to claim 1, further comprising:
   a partition that divides a first area through which the cut target wire is passed and a second area through which the wire other than the cut target wire is passed,
   wherein the notch exposes a part of the cut target wire that is passed through the first area to the outside.

3. The wire protector according to claim 2, further comprising:
   a top plate portion partially covering the plurality of wires;
   a first side wall extended from one side edge of the top plate portion; and
   a second side wall extended from the other side edge of the top plate portion,
   wherein the partition defines the first area together with the top plate portion and the first side wall, and the partition defines the second area together with the top plate portion and the second side wall, and
   wherein the notch is an opening that spans the first side wall and the top plate portion.

4. The wire protector according to claim 1, further comprising:
   a partition that divides a first area through which the cut target wire is passed and a second area through which the wire other than the cut target wire is passed,
   wherein the partition includes a widened portion that bulges toward at least one of the side of the first area and the side of the second area, and
   wherein the notch includes a hole portion formed in the partition so as to divide the widened portion into the side of the first area and the side of the second area.

5. The wire protector according to claim 4, further comprising:
   a top plate portion partially covering the plurality of wires;
   a first side wall extended from one side edge of the top plate portion; and
   a second side wall extended from the other side edge of the top plate portion,
   wherein the partition defines the first area together with the top plate portion and the first side wall, and defines the second area together with the top plate portion and the second side wall,
   wherein a part of the first side wall protrudes in a direction away from the second side wall,
   wherein the widened portion of the partition bulges toward at least the side of the first side wall, and
   wherein the notch includes the hole portion and a sidewall notch formed in the first side wall so as to extend along the hole portion.

6. The wire protector according to claim 1,
   wherein a sticker is affixed to the wire protector so as to instruct a cutting of the cut target wire in the emergency.

7. The wire protector according to claim 6, further comprising:
   a flat surface formed around the notch and to which the sticker is affixed.

8. The wire protector according to claim 1,
wherein the wire protector is applied to a vehicle including a relay connected to the power source, and
wherein the relay is allowed to be closed when current flows in the cut target wire.

9. The wire protector according to claim 8,
wherein the relay is opened when a start switch of the vehicle is turned off, and
wherein, in the emergency, the start switch is not turned off by an occupant of the vehicle and the relay is left open.

10. The wire protector according to claim 8,
wherein the vehicle includes an electric motor that outputs driving power to a wheel, and a power control device that is connected to the power source and drives the electric motor, and
wherein the wire protector is installed on a top surface of the power control device to regulate paths of the plurality of wires.

* * * * *